(12) United States Patent
Dann et al.

(10) Patent No.: US 10,949,808 B2
(45) Date of Patent: Mar. 16, 2021

(54) SYSTEMS AND METHODS FOR MODIFYING TIME DATA IN A TIME MANAGEMENT SYSTEM

(71) Applicant: SAP SE, Walldorf (DE)

(72) Inventors: Wilko Dann, Ketsch (DE); Ralf Philipp, Altlussheim (DE); Christian Ortmann, Karlsdorf-Neuthard (DE); Tobias Haag, Wiesloch (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 15/730,126

(22) Filed: Oct. 11, 2017

(65) Prior Publication Data
US 2019/0108490 A1 Apr. 11, 2019

(51) Int. Cl.
*G06Q 10/00* (2012.01)
*G06Q 10/10* (2012.01)

(52) U.S. Cl.
CPC ..... *G06Q 10/1091* (2013.01); *G06Q 10/1057* (2013.01)

(58) Field of Classification Search
CPC .................................................. G06Q 10/00
USPC .............................................................. 705/32
See application file for complete search history.

(56) References Cited

U.S. PATENT DOCUMENTS

| | | | |
|---|---|---|---|
| 2008/0065461 A1* | 3/2008 | Doss .............. | G06Q 10/063114 705/7.15 |
| 2010/0036671 A1* | 2/2010 | Chu ....................... | G06Q 10/06 705/1.1 |
| 2011/0137769 A1* | 6/2011 | Nielsen .................. | G06Q 10/06 705/32 |

* cited by examiner

*Primary Examiner* — Russell S Glass
(74) *Attorney, Agent, or Firm* — Buckley, Maschoff & Talwalkar LLC (57) ABSTRACT

Retrieving and storing time data in a time management system includes configuring the memory to store time records according to a configuration. The configuration includes: a plurality of time types, each of the time records referencing one of the time types; one or more collision groupings, each of the collision groupings being referenced by one or more of the time types; and one or more collision resolution items, each of the collision resolution items referencing an incoming grouping and an existing grouping. The method further includes receiving an incoming time record which at least partially overlaps an existing time record, the incoming time record having a first time type and the existing time record having a second time type. The method further includes performing a modification to the stored time records based on the incoming time record and the existing time record.

19 Claims, 8 Drawing Sheets

SYSTEMS AND METHODS FOR MODIFYING TIME DATA IN A TIME MANAGEMENT SYSTEM

FIELD OF THE INVENTION

The disclosed embodiments are directed to retrieving, modifying, and storing time data in a time management computer system.

BACKGROUND

In conventional time management computer systems, employees record time data relating to absences from work according to absence types created by an administrator (e.g., a Human Resources department), such as vacation, educational leave, sickness, leave of absence, sabbatical and maternity or paternity leave. It is often the case that some types of absences have a higher priority than others. For example, in many countries, an employee does not have to use vacation time for time periods in which the employee is sick during a vacation. In such a case, a Human Resources (HR) administrator may record sick leave time for the portion of the employee's vacation during which the employee was sick.

A time management system may have collision checks in place to prevent time records from "colliding," i.e., overlapping in time. This helps ensure a proper handling of the time records, as well as a proper time valuation, because for any specific time period, there should only be one unique time record. Therefore, an HR administrator must modify existing absences in case there is an overlap with a sick leave record. Manual adjustments of this sort are cumbersome and error prone.

A conventional time management system may provide an automated way to adjust overlapping absences. Such systems may specify which types of absences have a higher priority than other types of absences. However, such configurations may be inflexible and hard to maintain. For example, a simple prioritization via a numeric order has the significant disadvantage that a user may have to modify the entire configuration if many absence types are added, deleted, or assigned new priority levels.

SUMMARY

The disclosed configuration for handling time data in a time management system is flexible and easy to maintain. In addition, the disclosed configuration results in a system which is backward compatible, i.e., if a user does not want to use the features which provide automated modification of absence time records, then there is no need to make changes to the time management system. The disclosed configuration also allows for a simple form of collision resolution to be easily implemented. In such a case, the user merely creates one collision grouping and a collision resolution object with one collision resolution item, as discussed in further detail below.

The disclosed embodiments provide a method for configuring a time management system to resolve collisions between incoming and existing time types, e.g., types of absences. The method may include defining a collision grouping, creating a matrix of time types, determining which time types have priority in a given collision, and resolving these collisions automatically. In disclosed embodiments, the collision resolution may occur at the time the conflicting time data is entered by an employee, without the need for presenting an error message or alerting an administrator.

In disclosed embodiments, time conflict resolution may include creating a collision grouping, assigning the grouping to a number of time types, enabling collision resolution in the existing system by creating a time management collision resolution instance, designating a set of criteria to which the specific collision resolution applies, and specifying what action, if any, should be taken upon detection of a collision, based on a collision resolution matrix.

In disclosed embodiments, a collision grouping is a logical grouping of time types for collision resolution and handling purposes. Any number of time types may be assigned to any given collision grouping, or to multiple collision groupings. Similarly, any number of different collision groupings may be active at a given time. A collision grouping may have a name representative of its function, e.g., "Vacation-Sickness Resolution," so time types in a given collision grouping are readily identifiable.

In one aspect, the disclosed embodiments are a method, and corresponding system, for retrieving and storing time data in a time management computer system having at least one server with a memory, a processor, and a network interface. The method includes configuring the memory, using the processor, to store time records according to a configuration. The configuration includes: a plurality of time types, each of the time records referencing one of the time types; one or more collision groupings, each of the collision groupings being referenced by one or more of the time types; and one or more collision resolution items, each of the collision resolution items referencing an incoming grouping and an existing grouping. The method further includes receiving, via the network interface, an incoming time record which at least partially overlaps an existing time record, the incoming time record having a first time type and the existing time record having a second time type. The method further includes performing, using the processor, if a collision resolution item exists which corresponds to the first time type and the second time type, a modification to the stored time records based on the incoming time record and the existing time record.

The disclosed embodiments may include one or more of the following features.

The method may include determining whether the first time type references one of the collision groupings, deemed to be a first collision grouping, and determining whether the second time type references one of the collision groupings, deemed to be a second collision grouping. The method may further include determining whether one of the collision resolution items, deemed to be a first collision resolution item, specifies the first collision grouping as the incoming grouping thereof and specifies the second collision grouping as the existing grouping thereof. The modification may be performed to the stored time records only if the first collision resolution item exists.

The first collision resolution item may specify the second collision grouping as the existing grouping thereof by specifically designating the second collision grouping as the existing grouping thereof. The first collision resolution item may specify the second collision grouping as the existing grouping thereof by using a parameter value which designates all other collision groupings, except for the incoming collision grouping, as the existing grouping of the first collision resolution item.

Each of the time types may specify an absence class from a set of absence classes including a sickness class. The time types which specify a sickness absence class may be configured to reference a sickness collision grouping. The sickness collision grouping may be specified as an incoming grouping of a sickness conflict resolution item, and the sickness conflict resolution item may designate all other collision groupings, except for the sickness collision grouping, as an existing grouping.

If the incoming time record falls entirely within the existing time record, the modification to the stored time records may include: cancelling the existing time record; creating two new portions of the existing time record which extend from ends of the incoming time record to outer ends of the cancelled existing time record (or shortening the existing time record and adding one new portion of the existing time record); and storing the incoming time record.

If the incoming time record extends beyond only a first end of the existing time record, the modification to the stored time records may include: cancelling the existing time record; creating a new portion of the existing time record which extends from a second end of the incoming time record to an outer end of the cancelled time record; and storing the incoming time record.

If the incoming time record extends beyond both ends of the existing time record, the modification to the stored time records may include: cancelling the existing time record; and storing the incoming time record.

If the existing time record comprises two portions with a gap there between and the incoming time record overlaps and extends beyond both ends of the gap, the modification to the stored time records may include: cancelling the two portions of the existing time record; creating two new portions of the existing time record which extend from ends of the incoming time record to outer ends of the two cancelled portions; and storing the incoming time record.

DETAILED DESCRIPTION

Figure 1:
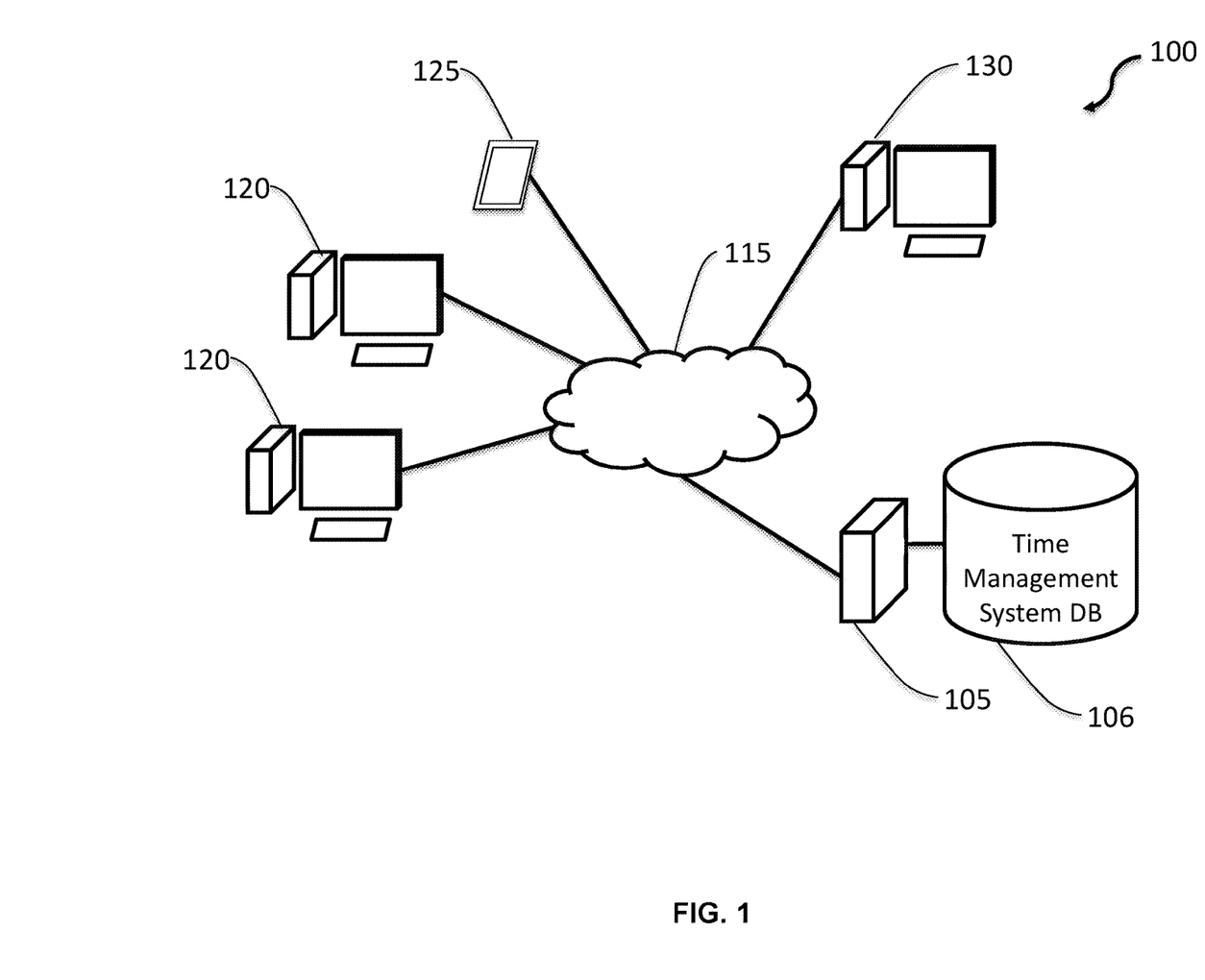
FIG. 1 is a block diagram of a time management system implementing absence time conflict resolution.

FIG. 1 is a block diagram of a time management system implementing absence time conflict resolution. The time management system 105 includes a database 106 which stores information input by employees relating to attendance (e.g., regular work hours and overtime hours) and absence (e.g., vacation, sick leave, etc.). The time information includes, among other things, a date or date range, a quantity of time (e.g., hours or days), and a time type (e.g., sickness with certificate). The time management system 105 may be accessed via the network 115 using various devices, such as, for example, computers 120 and mobile devices 125. The time management system 105 may also be accessed by administrative personnel via Human Resources (HR) computer systems 130.

Figure 2A:
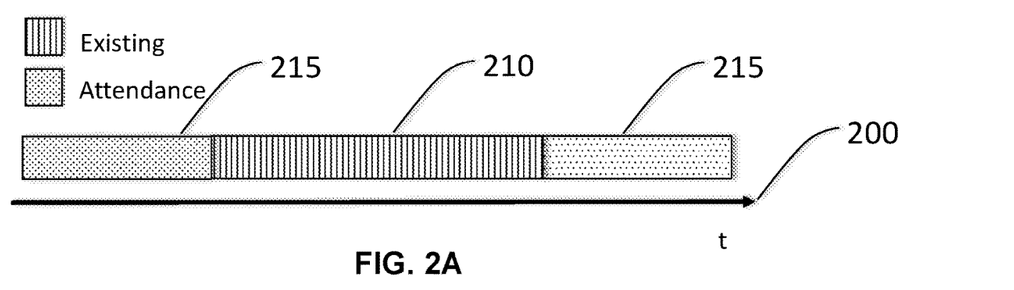
FIGS. 2A-2C are time plots depicting the modification of an existing absence time record to accommodate an incoming absence time record which falls entirely within the existing absence.
Figure 2B:
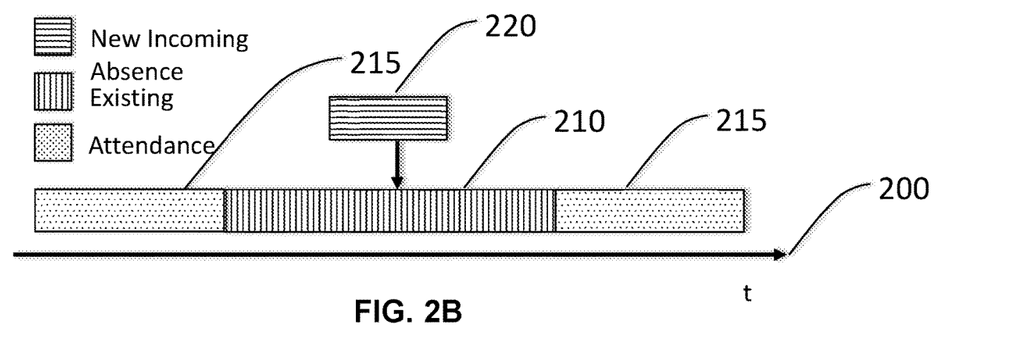
Figure 2C:
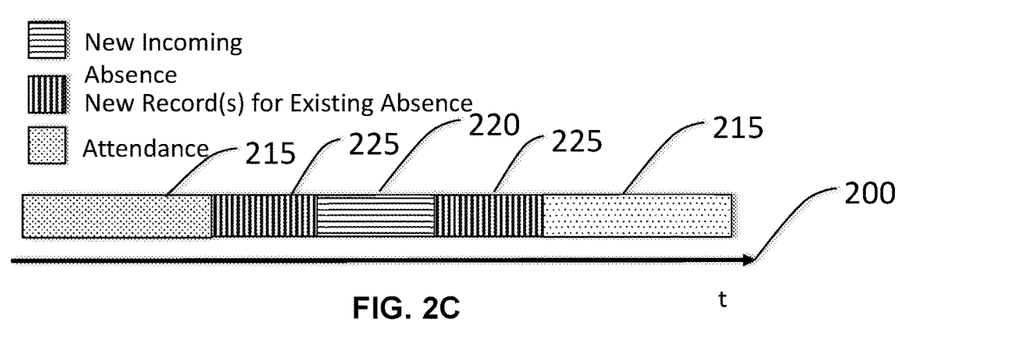

FIGS. 2A-2C are time plots depicting the modification of an existing absence time record to accommodate an incoming absence time record which falls entirely within the existing absence. FIG. 2A shows a timeline 200 in which an existing absence time record 210 falls within periods of attendance time records 215. Depending upon the specific configuration of the time management system, entry of attendance time records may not be necessary because it may be assumed that employees are in attendance during work periods in which no absence time is recorded. In some cases, other systems may handle attendance time in the payroll system. FIG. 2B shows an incoming absence time record 220, which for purposes of discussion is assumed to have a higher priority than the existing absence 210. For example, the incoming absence 220 may be a sickness absence, which should replace most or all other types of existing absences, such as vacation absences. The incoming absence time record 220 falls entirely within the time period of the existing absence time record 210 without overlapping either end point of the existing absence 210. As shown in FIG. 2C, to store the incoming absence time record 220, the existing absence record 210 is divided into two new records 225 of the same time type as the existing absence 210. The incoming absence time record 220 is stored in between the newly-created absence time records 225. Such a modification would be used if, for example, an employee was sick during an intermediate portion of a vacation.

Figure 3A:
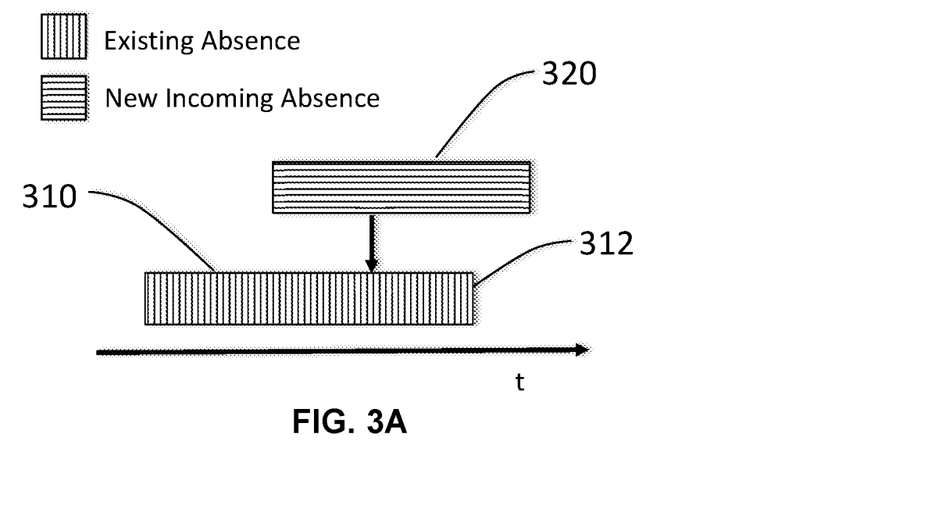
FIGS. 3A and 3B are time plots depicting the modification of an existing absence time record to accommodate an incoming absence time record which extends beyond one end of the existing absence.
Figure 3B:
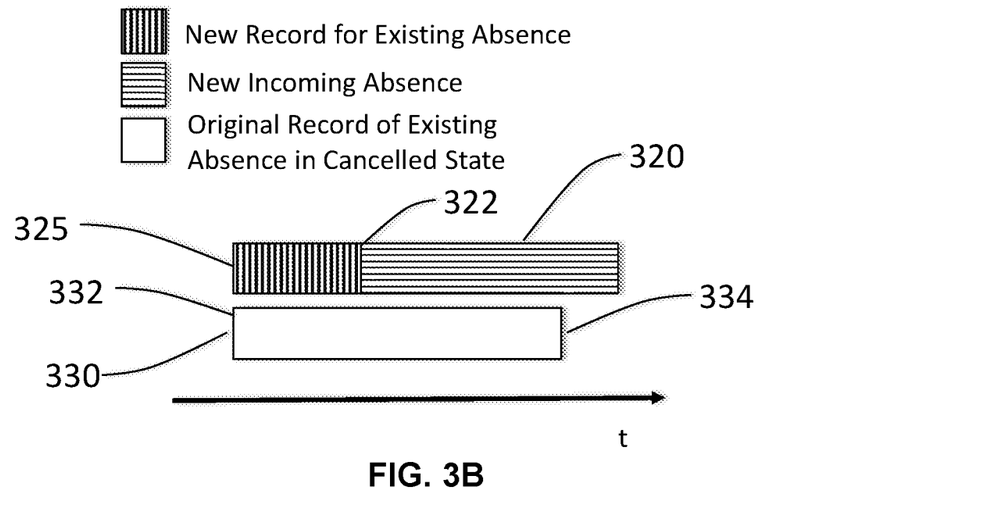

FIGS. 3A and 3B are time plots depicting the modification of an existing absence time record 310 to accommodate an incoming absence time record 320 which extends beyond one end 312 of the existing absence. FIG. 3A shows an incoming absence time record 320, e.g., a sickness absence, which has a higher priority than the existing absence time record 310, e.g., a vacation absence. The incoming absence time record 320 is coincident with a portion of the time period of the existing absence 310 and overlaps timewise one end 312 of the existing absence. As shown in FIG. 3B, to store the incoming absence time record 320, the existing absence record is cancelled 330, and a new record 325 is created of the same time type as the existing absence 310. The new record 325 extends from the end 332 of the cancelled absence time record 330 which is not overlapped by the incoming absence time record 320 to the non-overlapping end 322 of the incoming absence time record 320. The incoming absence time record 320 is stored adjacent the newly-created absence time record 325 such that it extends beyond the opposite end 334 of the cancelled absence time record 330. Such a modification would be used if, for example, an employee was sick during the end portion of a vacation, and the sickness continued beyond the end of the vacation period (i.e., extends into a period which would otherwise would have been an attendance period).

Figure 4A:
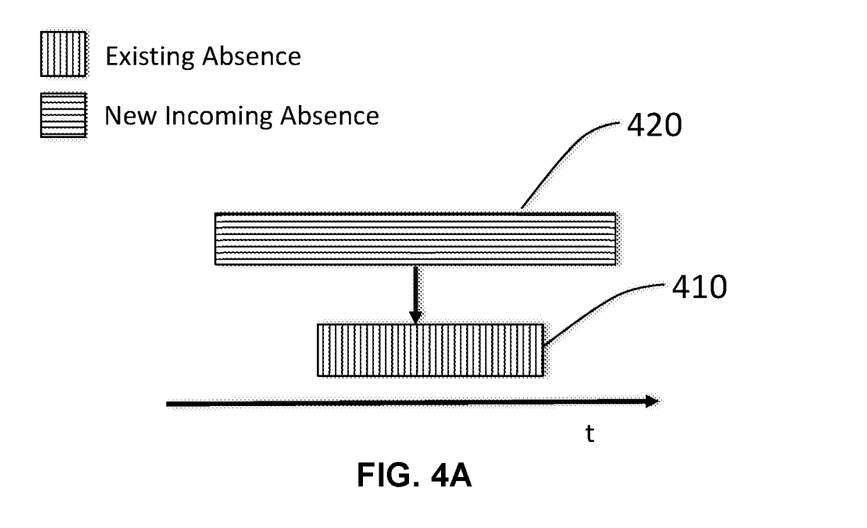
FIGS. 4A and 4B are time plots depicting the modification of an existing absence time record to accommodate an incoming absence time record which extends beyond both ends of the existing absence time record.
Figure 4B:
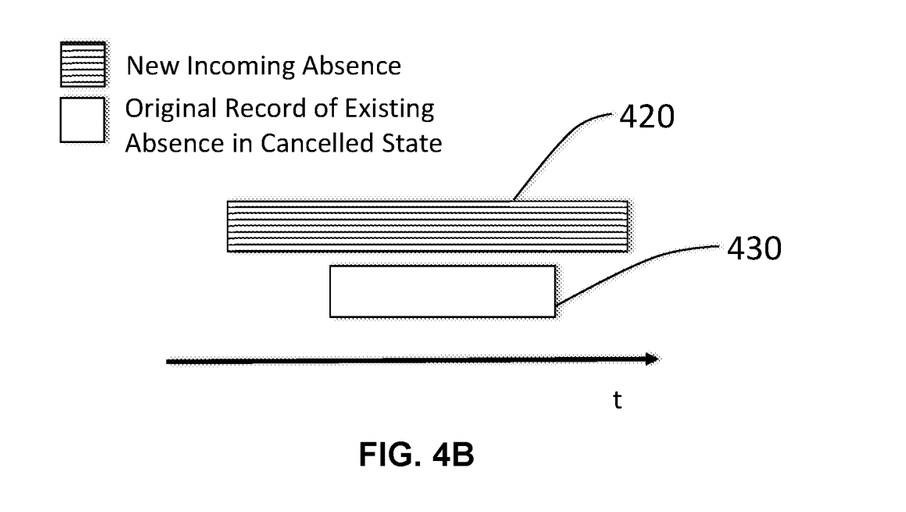

FIGS. 4A and 4B are time plots depicting the modification of an existing absence time record 410 to accommodate an incoming absence time record 420 which extends beyond both ends of the existing absence time record 410. FIG. 4A shows an incoming absence time record 420, e.g., a sickness absence, which has a higher priority than the existing absence time record 410, e.g., a vacation absence. The incoming absence time record 420 is coincident with a portion of the time period of the existing absence time record 410 and extends beyond both ends of the existing absence 410. As shown in FIG. 4B, to store the incoming absence time record 420, the existing absence record is cancelled 430. The incoming absence 420 is stored in place of the cancelled absence time record 430 such that it extends beyond both ends of the cancelled absence time record 430. Such a modification would be used if, for example, an employee was sick before a vacation period, during the entire vacation period, and beyond the end of the vacation period (i.e., extends into periods before and after the vacation absence which otherwise would have been an attendance period).

Figure 5A:
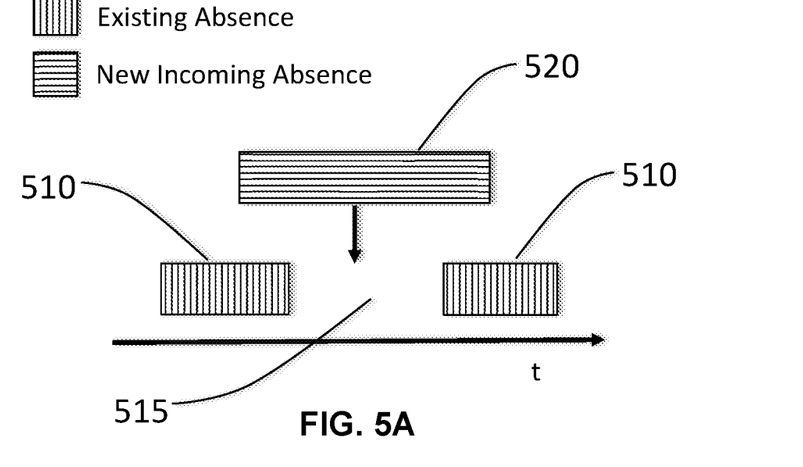
FIGS. 5A and 5B are time plots depicting the modification of two existing absence records to accommodate an incoming absence time record which extends beyond both ends of a gap between the existing absence time records.
Figure 5B:
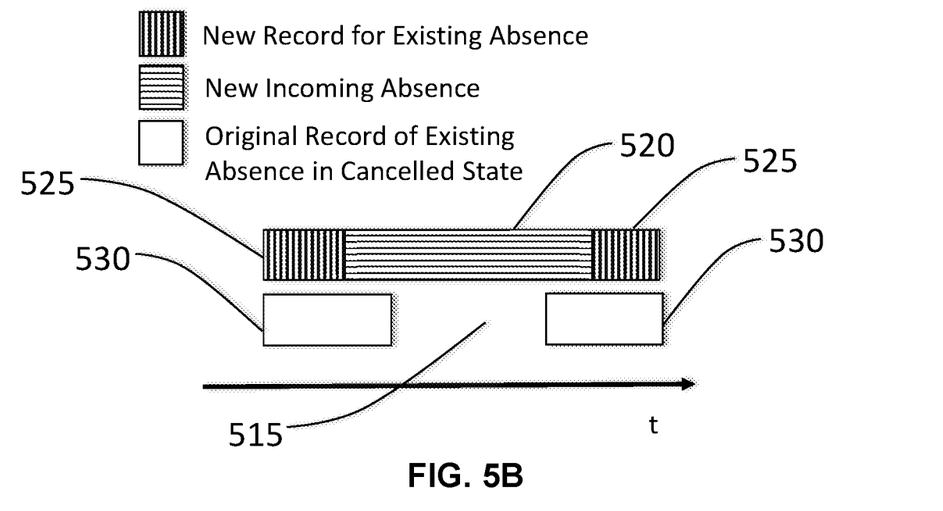

FIGS. 5A and 5B are time plots depicting the modification of two existing absence records 510 to accommodate an incoming absence time record 520 which extends beyond both ends of a gap 515 between the existing absence time records 510. FIG. 5A shows an incoming absence time record 520, e.g., a sickness absence, which has a higher priority than the existing absence time records 510, e.g., a vacation or public holiday absence. The incoming absence time record 520 is coincident with a portion of the time period of both of the two existing absences 510 and overlaps inside ends of both of the existing absences 510 and the entire gap 515 between the two existing absences. As shown in FIG. 5B, to store the incoming absence time record 510, the two existing absence records are both cancelled 530 and two new absence time records 525 are created of the same time type as the existing absences 510. The new records 525 extend from the outer ends of the cancelled absence time records 530 (i.e., the ends which are not overlapped by the incoming absence time record 520) to the ends of the incoming absence time record 520. The incoming absence time record 520 is stored in between, and adjacent to, these newly-created absence time records 525 such that it extends beyond both ends of the gap 515 between the cancelled absence time records 530. Such a modification would be used if, for example, an employee was sick during the end portion of a vacation, through an intermediate period (i.e., through a period which would otherwise would have been an attendance period), and during an initial portion of a subsequent public holiday period.

Figure 6:
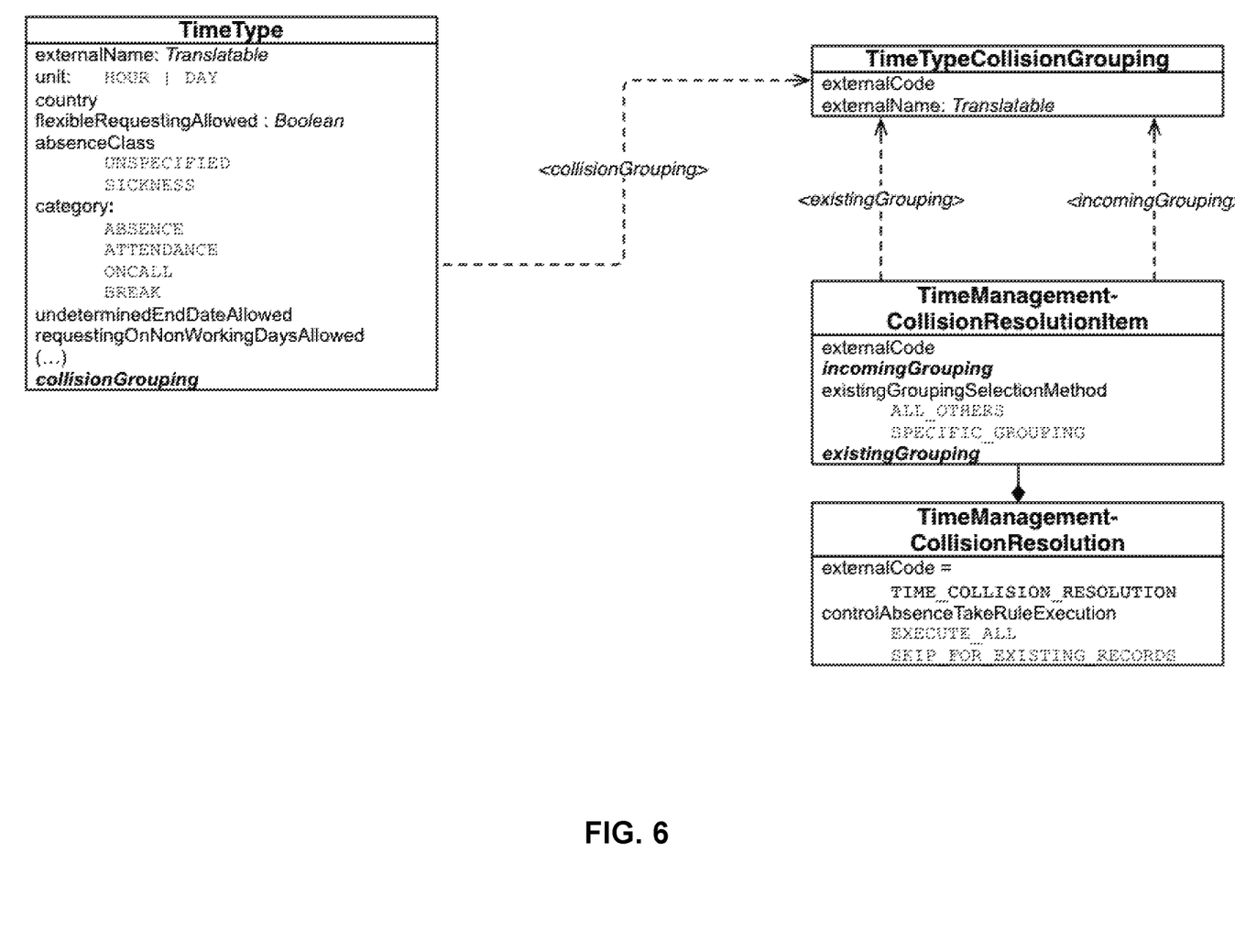
FIG. 6 depicts a configuration for implementing time record collision resolution in a time management system.

FIG. 6 depicts a configuration for implementing time type collision resolution in a time management system. Time entries in the time management system are characterized by a "time type," such as, for example, regular time, overtime, vacation, maternity leave, etc. Time types may be defined using a TimeType entity which specifies various parameters relating to the corresponding time type. For example, each time type may be grouped into a category of a defined set of categories, e.g., absence, attendance, on-call, and break. In such a case, the TimeType entity may specify, e.g., the "absence" category from the set of defined categories. The "absence" category may include dozens, perhaps hundreds, of different types of absences, e.g., sickness with certificate, sickness without certificate, long term sickness, holiday, vacation, leave without pay, sabbatical, maternity leave, etc.

In disclosed embodiments, a time type is system entity that categorizes a given employee time record. Time types may correspond with either attendance or absence times, and are used by employees to comprehensively account for the time they would normally spend at work. For example, some absence time types may be called "sickness," "regular recreational vacation," "long service leave," or "paid time off (PTO)." In disclosed embodiments, employees using the time management system may choose the proper time type from a menu provided by the time management application. In addition, users may easily add additional custom time types and may modify existing ones. In disclosed embodiments, all of the time types may be defined by the user (e.g., an administrator). In some cases, the user may import a set of sample time types provided with an initial system configuration.

In disclosed embodiments, conflict resolution may be performed within a particular category, e.g., absences. For example, a conflict may arise when time has been recorded with the time type "vacation," but an employee later records an at least partially overlapping period of time type "sickness with certificate," i.e., a sickness for which the employee has provided documentation. Both of these time types are in the category "absence." Furthermore, a number of related time types may be grouped together. For example, the various time types relating to sickness, e.g., sickness with certificate, sickness without certificate, long term sickness, etc., may be grouped into an "absence class" called "sickness." The TimeType entity may specify this grouping using the parameter absenceClass. This aspect of the configuration allows similar time types to be handled in a similar manner by the time management system.

In disclosed embodiments, time types having the category "absence" may include a reference, collisionGrouping, to a collision group entity, TimeTypeCollision Grouping. The collision group contains a unique identifier (externalCode) and an external name (externalName). All time types that have an assignment, i.e., reference, to this particular collision group are members of the group. The collision group itself does not have direct members.

In addition to the definition of collision groups, the system also provides entities to apply collision resolution to the defined groups. These entities effectively form a whitelist for providing collision resolution. The primary entity for collision resolution is an object which, in the depicted example, is called TimeManagementCollisionResolution. If this object is not defined, then standard collision checks are applied, which means that a detected collision produces an error rather than initiating a split/delimit process. This results in a default condition in which no collision split/delimit processing is performed, which is desirable for backward compatibility reasons. In disclosed embodiments, there is only one instance of the collision resolution object in the system. There may be a validation in the system which prevents the creation of multiple instances. Therefore, at runtime, only this collision resolution object needs to be processed.

The collision resolution object contains an external code and a parameter which controls whether the collision resolution is applied to all records or only to new records (i.e., "skip for existing records"). The collision resolution object also contains a number of collision resolution items (TimeManagementCollisionResolutionItem). Each collision resolution item specifies collisions that are resolved by the system automatically, i.e., without requiring manual review and revision of time entries. For each collision resolution item, an existing absence group (existingGrouping) is specified (i.e., an absence group associated with a non-overlapping, previously-entered absence time record) and an incoming absence group (incomingGrouping) is specified (i.e., an absence group associated with a new absence time record which at least partially overlaps the existing absence time record).

By virtue of this configuration, absences with a time type specified by the incoming group (incomingGrouping) of a collision resolution item (TimeManagement CollisionResolutionItem) trigger a split and delimit action with respect to the absence time records in the event of a collision with an absence time type specified by the existing group (existingGrouping). In disclosed embodiments, it may be desirable to configure the system so that a particular incoming group will trigger a split or delimit action for all other absence types in the system. For example, the system may be configured so that incoming absences of time type "sickness" will trigger a split and delimit process for any existing absence time type. To implement such a configuration, the corresponding collision resolution item (i.e., the item for incomingGrouping="sickness") may include a parameter (existingGroupingSelection Method) which is set to "ALL_OTHERS," thereby indicating that collision resolution is to be performed for existing absence records of all time types (except time types which are specified by incomingGrouping). Alternatively, the selection parameter may be set to "SPECIFIC_GROUPING," in which case collision resolution will only be performed for existing absence records of the time type specified by the existingGrouping parameter.

Figure 7:
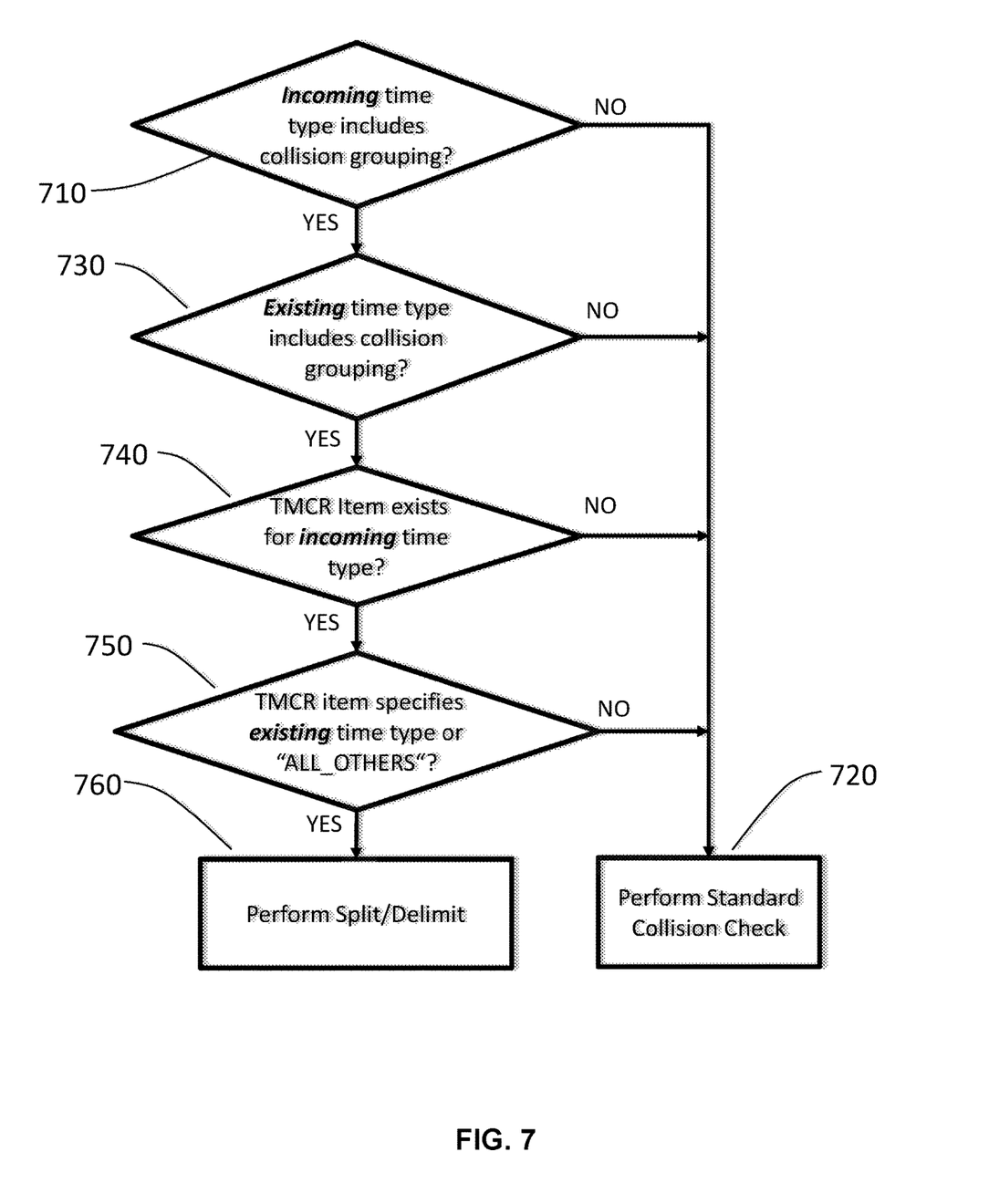
FIG. 7 is a flowchart of an embodiment of an algorithm which uses the configuration of FIG. 6 to retrieve, modify, and store time data to correct a collision between absence time records in a time management system.

FIG. 7 is a flowchart of an embodiment of an algorithm which uses the configuration of FIG. 6 to retrieve, modify, and store time data to correct a collision between absence time records in a time management system. The correction of a collision is based on an existing stored time record of a particular time type and an incoming time record of another time type. An incoming time record is checked to see if the time type of the record is included in any of the defined collision groupings, i.e., the time type object associated with the incoming time record is checked to see if it references a collision group 710. If the time type of the incoming time record is not included in any of the collision groups, then a standard collision check is performed 720. In such a case, in the event of a collision, the system returns an error message, rather than modifying the time data to correct the collision.

If, on the other hand, the time type of the incoming time record is included in a collision group, then the existing time record is checked to see if its time type is included in a collision grouping 730. If not, then a standard collision check is performed 720. If so, then it is determined whether a time management collision resolution (TMCR) item exists for the time type of the incoming time record 740. If not, then a standard collision check is performed 720.

If a TMCR item exists for the incoming time type, then it is determined whether the TMCR specifies that collision resolution is to be performed for the existing time type or all other time types ("ALL_OTHERS"), i.e., all existing time types other than the incoming time type 750. If so, then a split/delimit conflict resolution is performed on the existing time record 760. If not, then a standard collision check is performed 720. For purposes of discussion, the term "split/delimit" is used to describe the conflict resolution process performed in embodiments disclosed herein, including cancellation of the existing time record. However, other types of modifications, e.g., extension, may be made to the existing time record.

Figure 8:
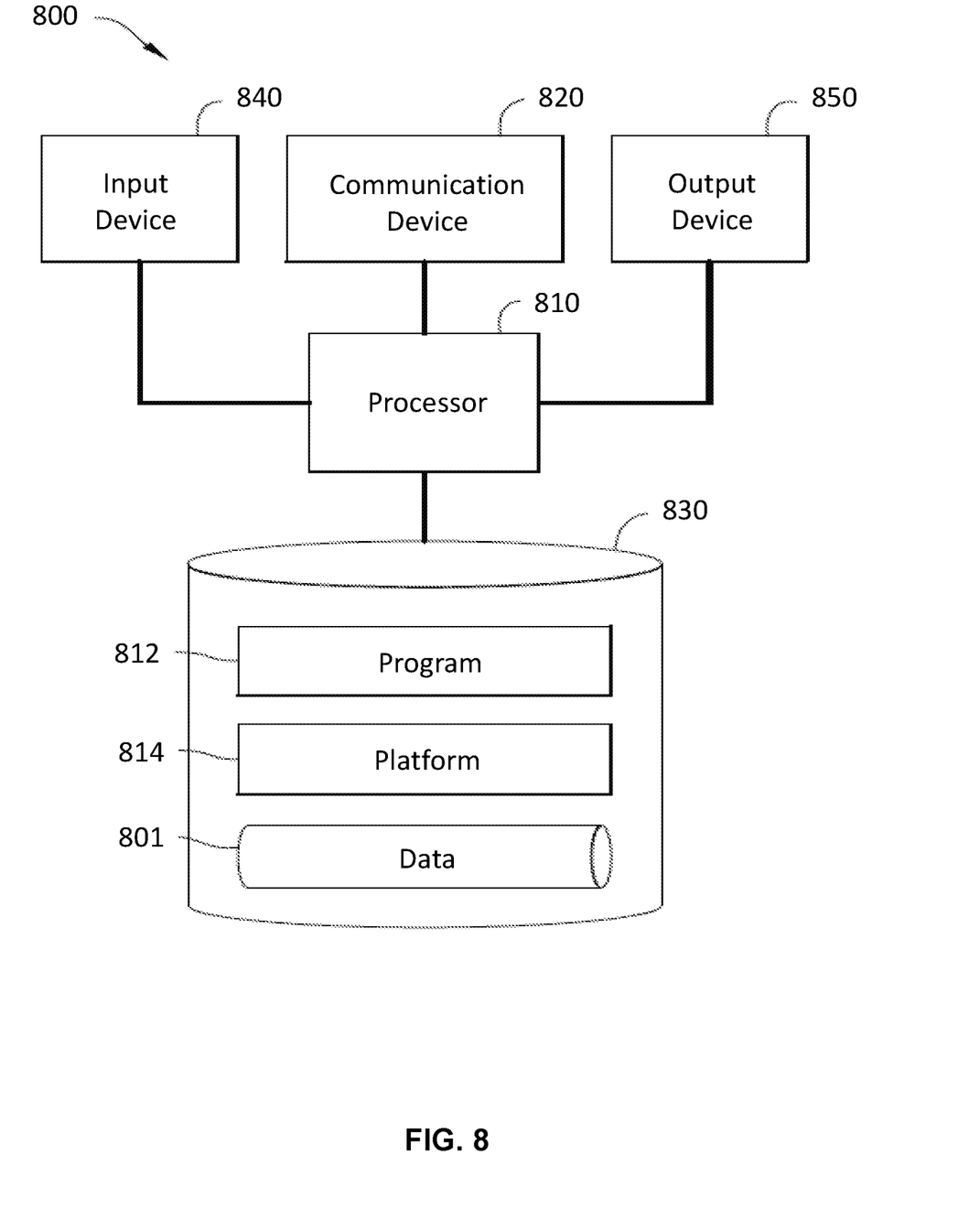
FIG. 8 is a block diagram of a system according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of system 100. Apparatus 800 may include other elements which are not shown, according to some embodiments.

Apparatus 800 includes processor 810 operatively coupled to communication device 820, data storage device/memory 830, one or more input devices 840, and one or more output devices 850. Communication device 820 may facilitate communication with external devices, such as an application server. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to manipulate graphical user interfaces and to input information into apparatus 800. Output device(s) 850 may comprise, for example, a display (e.g., a display screen) a speaker, and/or a printer.

Data storage device/memory 830 may comprise any device, including combinations of magnetic storage devices (e.g., magnetic tape, hard disk drives and flash memory), optical storage devices, Read Only Memory (ROM) devices, Random Access Memory (RAM) etc.

The storage device 830 stores a program 812 and/or platform logic 814 for controlling the processor 810. The processor 810 performs instructions of the programs 812, 814, and thereby operates in accordance with any of the embodiments described herein, including but not limited to the disclosed processes.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method of retrieving and storing time data in a time management computer system having at least one server with a memory, a processor, and a network interface, the method comprising:
configuring the memory, using the processor, to store time records according to a configuration comprising:
a plurality of time types, each of the time records referencing one of the time types and wherein a time type is a category applied to a time entry;
one or more collision groupings, wherein each collision grouping is a logical grouping of at least two time types that overlap with each other, each of the collision groupings being referenced by one or more of the time types; and
one or more collision resolution items, each of the collision resolution items referencing an incoming grouping and an existing grouping;
receiving, at a user interface, input including a recorded time entry and a time type for the recorded time entry;
receiving, via the network interface, a first time record including the received recorded time entry and the time type for the recorded time entry;
storing the first time record, wherein upon storing, the first time record is an existing time record;
receiving, via the user interface and the network interface, an incoming time record which at least partially overlaps the existing time record, the incoming time record having a first time type and the existing time record having a second time type, wherein the first type is different from the second type; and
performing, using the processor, if a collision resolution item exists which corresponds to the first time type and the second time type, a modification to the stored time records based on the incoming time record and the existing time record, wherein if the incoming time record falls entirely within the existing time record, the modification to the stored time records comprises:
cancelling the existing time record;
creating two new portions of the existing time record which extend from ends of the incoming time record to outer ends of the cancelled existing time record; and
storing the incoming time record.

2. The method of claim 1, further comprising:
determining whether the first time type references one of the collision groupings, deemed to be a first collision grouping;
determining whether the second time type references one of the collision groupings, deemed to be a second collision grouping; and
determining whether one of the collision resolution items, deemed to be a first collision resolution item, specifies the first collision grouping as the incoming grouping thereof and specifies the second collision grouping as the existing grouping thereof,
wherein the modification is performed to the stored time records only if the first collision resolution item exists.

3. The method of claim 2, wherein the first collision resolution item specifies the second collision grouping as the existing grouping thereof by specifically designating the second collision grouping as the existing grouping thereof.

4. The method of claim 2, wherein the first collision resolution item specifies the second collision grouping as the existing grouping thereof by using a parameter value which designates all other collision groupings, except for the incoming collision grouping, as the existing grouping of the first collision resolution item.

5. The method of claim 1, wherein each of the time types specifies an absence class from a set of absence classes including a sickness class.

6. The method of claim 5, wherein the time types which specify a sickness absence class are configured to reference a sickness collision grouping.

7. The method of claim 6, wherein the sickness collision grouping is specified as an incoming grouping of a sickness conflict resolution item, and the sickness conflict resolution item designates all other collision groupings, except for the sickness collision grouping, as an existing grouping.

8. A method of retrieving and storing time data in a time management computer system having at least one server with a memory, a processor, and a network interface, the method comprising:
configuring the memory, using the processor, to store time records according to a configuration comprising:
a plurality of time types, each of the time records referencing one of the time types and wherein a time type is a category applied to a time entry;
one or more collision groupings, wherein each collision grouping is a logical grouping of at least two time types that overlap with each other, each of the collision groupings being referenced by one or more of the time types; and
one or more collision resolution items, each of the collision resolution items referencing an incoming grouping and an existing grouping;
receiving, at a user interface, input including a recorded time entry and a time type for the recorded time entry;
receiving, via the network interface, a first time record including the received recorded time entry and the time type for the recorded time entry;
storing the first time record, wherein upon storing, the first time record is an existing time record;
receiving, via the user interface and the network interface, an incoming time record which at least partially overlaps the existing time record, the incoming time record having a first time type and the existing time record having a second time type, wherein the first type is different from the second type; and
performing, using the processor, if a collision resolution item exists which corresponds to the first time type and the second time type, a modification to the stored time records based on the incoming time record and the existing time record, wherein, if the existing time record comprises two portions with a gap there between and the incoming time record overlaps and extends beyond both ends of the gap, the modification to the stored time records comprises:
cancelling the two portions of the existing time record;
creating two new portions of the existing time record which extend from ends of the incoming time record to outer ends of the two cancelled portions; and
storing the incoming time record.

9. A system for performing retrieving and storing of time data in a time management computer system, the system comprising at least one server having a processor, memory, and a network interface, said at least one server being adapted to perform:
configuring the memory, using the processor, to store time records according to a configuration comprising:
a plurality of time types, each of the time records referencing one of the time types and wherein a time type is a category applied to a time entry;

one or more collision groupings, wherein each collision grouping is a logical grouping of at least two time types that overlap with each other, each of the collision groupings being referenced by one or more of the time types; and one or more collision resolution items, each of the collision resolution items referencing an incoming grouping and an existing grouping;

receiving, at a user interface, input including a recorded time entry and a time type for the recorded time entry;

receiving, via the network interface, a first time record including the received recorded time entry and the time type for the recorded time entry;

storing the first time record, wherein upon storing, the first time record is an existing time record;

receiving, via the user interface and the network interface, an incoming time record which at least partially overlaps the existing time record, the incoming time record having a first time type and the existing time record having a second time type, wherein the first type is different from the second type; and performing, using the processor, if a collision resolution item exists which corresponds to the first time type and the second time type, a modification to the stored time records based on the incoming time record and the existing time record, wherein if the incoming time record extends beyond only a first end of the existing time record, the modification to the stored time records comprises:

cancelling the existing time record;

creating a new portion of the existing time record which extends from a second end of the incoming time record to an outer end of the cancelled time record; and storing the incoming time record.

10. The system of claim 9, wherein said at least one server is further adapted to perform:

determining whether the first time type references one of the collision groupings, deemed to be a first collision grouping;

determining whether the second time type references one of the collision groupings, deemed to be a second collision grouping; and determining whether one of the collision resolution items, deemed to be a first collision resolution item, specifies the first collision grouping as the incoming grouping thereof and specifies the second collision grouping as the existing grouping thereof, wherein the modification is performed to the stored time records only if the first collision resolution item exists.

11. The system of claim 10, wherein the first collision resolution item specifies the second collision grouping as the existing grouping thereof by specifically designating the second collision grouping as the existing grouping thereof.

12. The system of claim 9, wherein each of the time types specifies an absence class from a set of absence classes including a sickness class.

13. The system of claim 12, wherein the time types which specify a sickness absence class are configured to reference a sickness collision grouping.

14. The system of claim 13, wherein the sickness collision grouping is specified as an incoming grouping of a sickness conflict resolution item, and the sickness conflict resolution item designates all other collision groupings, except for the sickness collision grouping, as an existing grouping.

15. A non-transitory computer-readable medium storing program instructions executed by a processor of at least one server of a computer system, the server having a processor, memory, and a network interface, the medium comprising instructions for causing the processor to perform:

configuring the memory, using the processor, to store time records according to a configuration comprising:

a plurality of time types, each of the time records referencing one of the time types and wherein a time type is a category applied to a time entry;

one or more collision groupings, wherein each collision grouping is a logical groping of at least two time types that overlap with each other, each of the collision groupings being referenced by one or more of the time types; and one or more collision resolution items, each of the collision resolution items referencing an incoming grouping and an existing grouping;

receiving, at a user interface, input including a recorded time entry and a time type for the recorded time entry;

receiving, via the network interface, a first time record including the received recorded time entry and the time type for the recorded time entry;

storing the first time record, wherein upon storing, the first time record is an existing time record;

receiving, via the user interface and the network interface, an incoming time record which at least partially overlaps the existing time record, the incoming time record having a first time type and the existing time record having a second time type, wherein the first type is different from the second type; and performing, using the processor, if a collision resolution item exists which corresponds to the first time type and the second time type, a modification to the stored time records based on the incoming time record and the existing time record, wherein if the incoming time record extends beyond both ends of the existing time record, the modification to the stored time records comprises:

cancelling the existing time record; and storing the incoming time record.

16. The non-transitory computer-readable medium of claim 15, medium further comprising instructions for causing the processor to perform:

determining whether the first time type references one of the collision groupings, deemed to be a first collision grouping;

determining whether the second time type references one of the collision groupings, deemed to be a second collision grouping; and determining whether one of the collision resolution items, deemed to be a first collision resolution item, specifies the first collision grouping as the incoming grouping thereof and specifies the second collision grouping as the existing grouping thereof, wherein the modification is performed to the stored time records only if the first collision resolution item exists.

17. The method of claim 1, further comprising:

maintaining a copy of the original stored time records after modification to the stored time records.

18. The method of claim 8, further comprising:

determining whether the first time type references one of the collision groupings, deemed to be a first collision grouping;

determining whether the second time type references one of the collision groupings, deemed to be a second collision grouping; and determining whether one of the collision resolution items, deemed to be a first collision resolution item, specifies the first collision grouping as the incoming grouping thereof and specifies the second collision grouping as the existing grouping thereof,
wherein the modification is performed to the stored time records only if the first collision resolution item exists.

19. The method of claim 18, wherein the first collision resolution item specifies the second collision grouping as the existing grouping thereof by one of: 1. specifically designating the second collision grouping as the existing grouping thereof; or 2. using a parameter value which designates all other collision groupings, except for the incoming collision grouping, as the existing grouping of the first collision resolution item.

* * * * *